July 2, 1935.　　　　F. A. BRIDGETT　　　　2,006,666

MOLD

Filed Dec. 9, 1933　　　　2 Sheets-Sheet 1

Inventor:
Frank A. Bridgett,
By　　　　
Attorney.

July 2, 1935.  F. A. BRIDGETT  2,006,666
MOLD
Filed Dec. 9, 1933  2 Sheets-Sheet 2

Inventor:
Frank A. Bridgett,
By
Attorney.

Patented July 2, 1935

2,006,666

UNITED STATES PATENT OFFICE 2,006,666

MOLD

Frank A. Bridgett, Philadelphia, Pa.

Application December 9, 1933, Serial No. 701,593

16 Claims. (Cl. 18—42)

My invention relates to improvements in molding, especially molding in which the mold cavity is formed by a plurality of cooperating mold elements.

The purpose of the invention is to provide improved method and means for molding objects having intricate surface formations or contours, such for example, as replicas of the bones of the human or animal skeleton.

The invention comprises mold elements, each having recesses or indentations which cooperate in forming a mold cavity corresponding to the object to be molded or cast: The said mold elements adapted to have relative separating movements in directions that will permit the withdrawal of the mold elements from each other and from the object which has been cast, so that the object with its intricate surface formation shall be unimpaired.

In furtherance of the purpose recited, the invention also comprises mold elements having reciprocal contacting surfaces, surrounding and adjacent the cavity, undulating to correspond with the predominant marginal contours of the cavity.

As illustrative of the invention, I have shown the same applied to the molding or casting of the temporal bone of the human skeleton. It will however, be understood that the invention will equally apply to the casting of other objects, especially anatomical, having intricate surface formations.

Referring to the drawings which illustrate, merely by way of example, suitable means for effecting the invention:—

Similar numerals refer to similar parts throughout the several views.

In the present example the mold is shown as comprising three elements 9, 10 and 11. Each is provided, as to its interior, with recesses and indentations which, in cooperation with the other elements, will form the cavity in which the object 12 is to be cast.

These several recesses may be formed in any suitable way, for example by forming preliminary casts or molds in plaster Paris, or the like, about the original bone, or a pattern thereof, and then ultimately forming therefrom the permanent mold in a suitable material, as for example, a metal; or these mold elements may be formed directly from metal, or other suitable material, by cutting or carving out the recesses of required formation.

Figure 2:
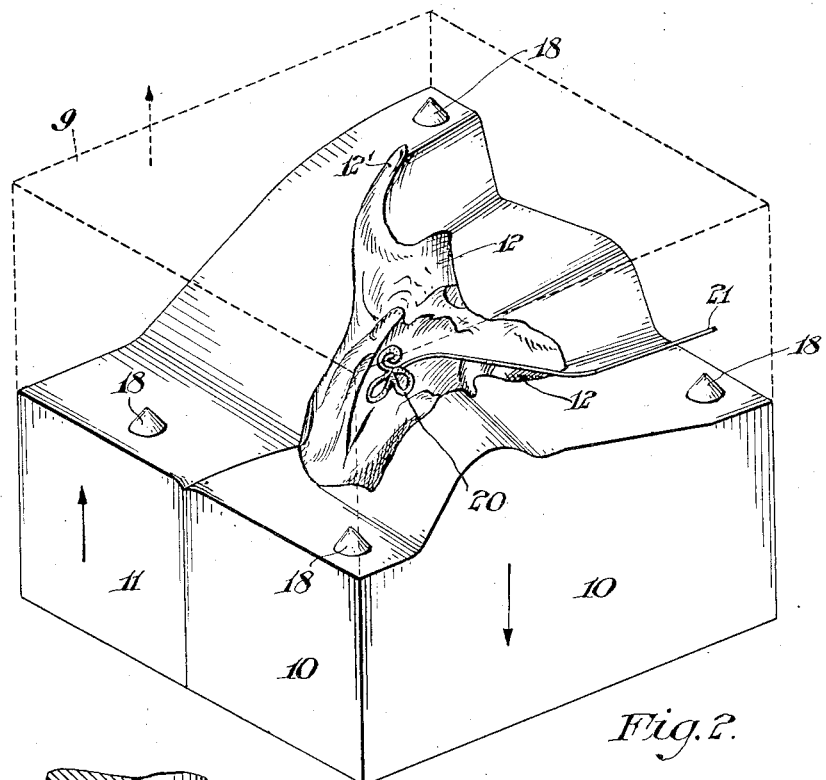
Fig. 2 is a similar view on a larger scale showing the two lower elements with the object cast associated therewith, the upper element being indicated in broken lines.

In forming these mold elements, it is essential that the surfaces of engagement and separation of the respective elements be so formed and related to the major or predominant margins of the casting to be formed in the mold cavity, that the said elements will be separable from each other and from the casting, without marring said casting or the adjacent surface walls of the mold elements. In the present example, the several elements are separable from each other by initial relative movement vertical to the plane of the base. This initial vertical movement is secured by the means employed for securing their proper association and register; as for example the projections 18 and corresponding recess, as shown in Fig. 2, or by the dowel-pin and recess 19 in Fig. 3.

For example, in separating the mold elements from each other and from the casting, element 9 is first initially moved in direction vertical to the plane of the base. It is then entirely removed from the elements 10 and 11 and from the casting 12.

Figure 1:
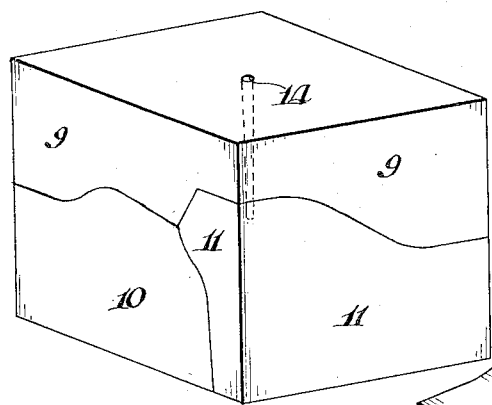
Fig. 1 is a perspective view of a mold comprising three elements.
Figure 5:
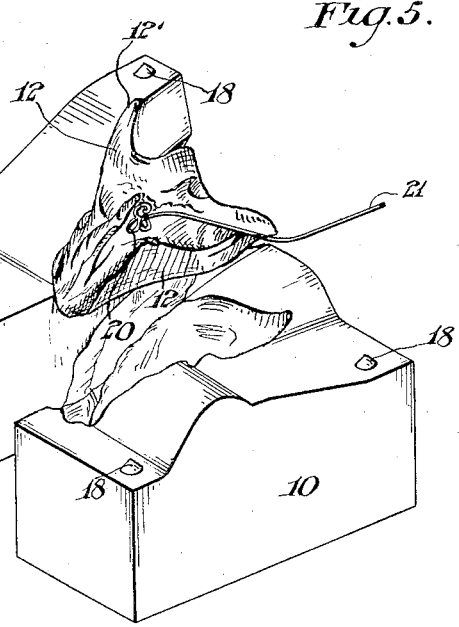
Fig. 5 is a perspective view showing two elements and the cast object and the manner of separation.
Figure 6:
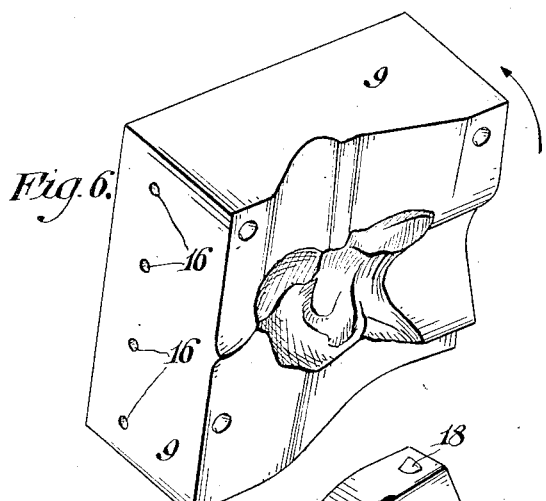
Figs. 6, 7 and 8 are perspective views of the three elements showing the cooperating recesses therein.
Figure 7:
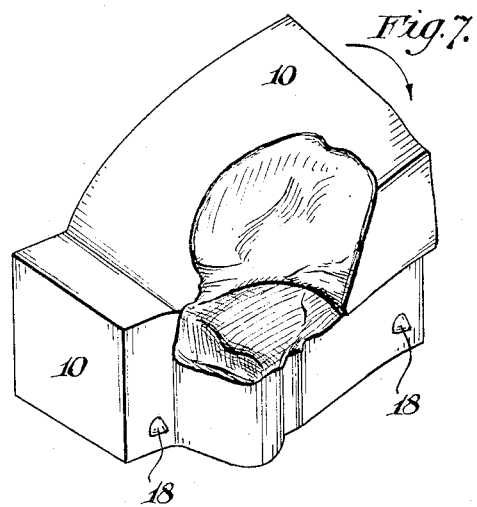
Figure 8:
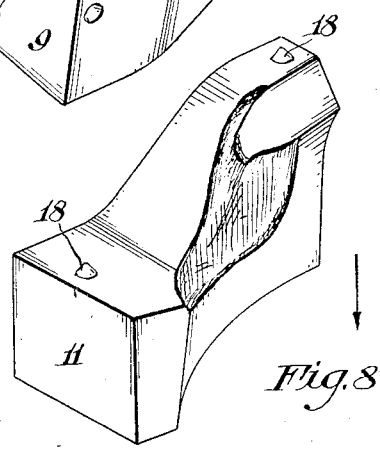

Element 11 is then moved initially in the same vertical direction and carries with it the casting 12, away from element 10, as shown in Fig. 5. Element 10 is then free to be entirely removed, and the casting 12 may then be dislodged from element 11 by a tilting or pivotal movement, which movement is required due to the peculiar curved contour of the major face of the cavity in element 11 and also to the embracing curved formation 12' representing the zygoma which forms part of the casting.

In the operation of casting, two methods are common, namely the extrusion method and the positive method.

The extrusion method may comprise the hand mold method in which no pressure chamber is provided, but is merely provided with a passage or passages of suitable dimensions for conveying the material through a mold element to the cavity, or it may comprise a pressure chamber for forcing the material, usually plastic or molten, through a suitable channel delivering to the cavity.

The positive method comprises pouring the material, as for example, in granular form, into the mold cavity, where it is subjected to a temperature sufficient to melt the same, so that it will completely fill the cavity and then become solidified.

In accordance with the extrusion method, I provide, in the example given, a pressure chamber, or cylinder 13 associated with the top of element 9. This chamber is provided with the material which is to be forced into the mold cavity. A channel 14, centrally disposed with respect to the chamber 13, passes through element 9 and delivers to cavity adapted to form the casting or object 12.

Figures 3, 4:
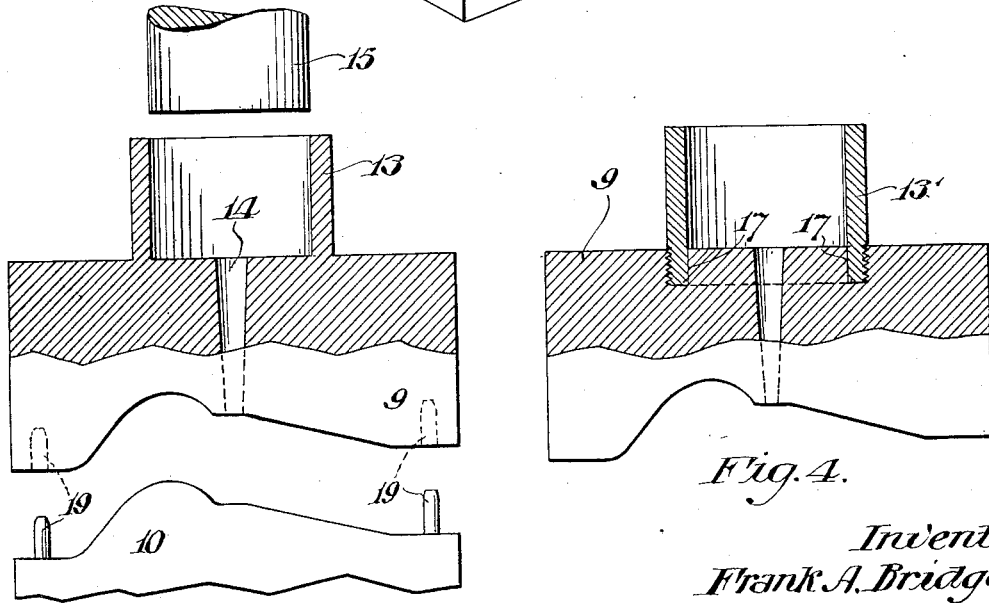
Figs. 3 and 4 are fragmentary sections.

A plunger 15, see Fig. 3, is adapted to enter the top of chamber 13 as the mold is raised in the usual way relatively to the plunger. In this way the material is forced from the pressure chamber into the cavity under sufficient pressure to insure a complete filling of the cavity and thus securing a perfect casting. During the casting operation, the mold element may be maintained at required temperature by means, for example, of channels 16 passing through the element 9, and supplied with steam or other temperature-controlling medium.

The chamber 13 may be associated with the mold in any suitable way: For example in Fig. 3, it is shown as integral with the mold element 9, while in Fig. 4, it is shown as 13', removably threaded into an annular channel or groove 17, provided in the top of the mold element.

The advantage of the removable pressure chamber is that, without the chamber, the mold may be used as a hand mold.

It will be understood that, depending upon the character of the casting, the number of elements may be increased or reduced, as required.

The outside dimensions of the completed mold may be such as to adapt it for use with the platens or other parts of standard machines.

As to the material suitable for the casting it should usually be plastic, such, for example, as the synthetic resin compounds of the thermoplastic and thermo-setting types, rubber, glass or the like.

The method and means for casting herein shown is especially adapted for making anatomical exhibits, in which, not only is the replica of the bone produced, as to its external surface contours, but such exhibit may at the same time comprise, for example, a bone formation with another formation encased therein; this interior formation being previously cast and suitably positioned in the mold cavity before introducing the material thereto.

The encased formation is, for example, of material of higher fusing point than that of the surrounding material, and suitable means, such as wire 21, is provided for supporting said formation in the cavity during the introduction of the enveloping material.

In this way, for example, certain nerves and nerve channels, such as the labyrinth 20, Fig. 2, made of opaque or non-transparent material, may be enclosed in a surrounding casting, representing the bone, of transparent material, so that an anatomical exhibit may be produced, in which the relation between the several formations may be readily seen from every side.

What I claim is:—

1. An anatomical mold structure comprising a composite body portion formed of a plurality of mold elements having recesses combining to form a casting cavity, said elements having complementary contacting faces surrounding and adjacent the cavity, the faces being formed with undulations throughout their entire area to correspond with the predominant marginal contour of the cavity.

2. An anatomical mold structure comprising a composite body portion formed of three mold elements having recesses combining to form a casting cavity, said elements having complementary contacting faces formed with undulations throughout their entire area, said undulations extending to the undulating predominant marginal contour of the cavity whereby to facilitate separation of said elements from each other and from the casting and means associated with said surfaces for cooperating in the proper assembly and register of said elements and to secure preliminary movement of separation along definite lines of travel.

3. A mold having a casting cavity with intricate surface and marginal contours comprising a plurality of mold elements having complementary recesses combining to form said cavity, each of said elements having surfaces of separation formed with undulations corresponding to the undulating predominant marginal contour of the cavity, said undulations extending to the undulating predominant marginal contour of the cavity whereby to facilitate separation of the mold elements from each other and from the casting.

4. A mold having a casting cavity with intricate surface and marginal contours, comprising a plurality of mold elements having complementary recesses combining to form said cavity, each of said elements having a portion of their surfaces of separation formed with undulations corresponding to the undulating predominant marginal contour of the cavity, said undulations extending to the undulating predominant marginal contours of the cavity whereby to facilitate separation of the mold elements from each other and from the casting.

5. A mold having a casting cavity with intricate surface and marginal contours comprising three mold elements having complementary recesses combining to form said cavity, each of said elements having surfaces of separation formed with undulations corresponding to the undulating predominant marginal contour of the cavity, said undulations extending to the undulating predominant marginal contours of the cavity whereby to facilitate separation of the mold elements from each other and from the casting.

6. A mold having a casting cavity with intricate surface and marginal contours, comprising three mold elements having complementary recesses combining to form said cavity, each of said elements having a portion of their surfaces of separation formed with undulations corresponding to the undulating predominant marginal contour of the cavity, said undulations extending to the undulating predominant marginal contour of the cavity whereby to facilitate separation of the mold elements from each other and from the casting.

7. A mold having a casting cavity with intricate surface and marginal contours comprising a plurality of mold elements having complementary recesses combining to form said cavity, each of said elements having surfaces of separation formed with undulations corresponding to the undulating predominant marginal contour of the cavity, said undulations extending to the undulating predominant marginal contour of the cavity whereby to facilitate separation of the mold elements from each other and from the casting and means to secure preliminary movement of separation of the elements along definite lines of travel.

8. A mold having a casting cavity with intricate surface and marginal contours comprising three mold elements having complementary recesses combining to form said cavity, each of said elements having surfaces of separation formed with undulations corresponding to the undulating predominant marginal contour of the cavity, said undulations extending to the undulating predominant marginal contours of the cavity whereby to facilitate separation of the mold elements from each other and from the casting and means to secure preliminary movement of separation of the elements along definite lines of travel.

9. A mold having a casting cavity with intricate surface contours, comprising a plurality of mold elements having complementary recesses combining to form said cavity, each of said elements having surfaces of separation formed with undulations corresponding to the undulating predominant marginal contour of the cavity, said undulations extending to the undulating predominant marginal contour of the cavity whereby to facilitate separation of said elements from each other and from the casting and means associated with said surfaces for cooperating in the proper assembly and register of said elements, comprising projections formed on one of the surfaces of separation of an element and corresponding recesses adapted to receive said projections formed in the separating surface of another element.

10. A mold having a casting cavity with intricate surface and marginal contours, comprising a plurality of mold elements having complementary recesses combining to form said cavity, each of said elements having a portion of their surfaces of separation formed with undulations corresponding to the undulating predominant marginal contour of the cavity, said undulations extending to the undulating predominant marginal contours of the cavity whereby to facilitate separation of the mold elements from each other and from the casting and means associated with said surfaces for cooperating in the proper assembly and register of said elements and to secure preliminary movement of separation along definite lines of travel.

11. A mold having a casting cavity with intricate surface and marginal contours comprising a plurality of mold elements having complementary recesses combining to form said cavity, each of said elements having surfaces of separation formed with undulations corresponding to the undulating predominant marginal contour of the cavity, said undulations extending to the undulating predominant marginal contour of the cavity whereby to facilitate separation of the mold elements from each other and from the casting and means to introduce material to the cavity comprising a passage connecting said cavity with the source of material to be introduced.

12. A mold having a casting cavity with intricate surface and marginal contours comprising a plurality of mold elements having complementary recesses combining to form said cavity, each of said elements having surfaces of separation formed with undulations corresponding to the undulating predominant marginal contours of the cavity, said undulations extending to the undulating predominant marginal contours of the cavity whereby to facilitate separation of the mold elements from each other and from the casting, one of said elements having a pressure chamber formed therewith and means to introduce material to the cavity comprising a passage formed in said element between the chamber and the cavity.

13. A mold having a casting cavity with intricate surface and marginal contours comprising three mold elements having complementary recesses combining to form said cavity, each of said elements having a portion of their surfaces of separation formed with undulations corresponding to the undulating predominant marginal contours of the cavity, said undulations extending to the undulating predominant marginal contours of the cavity whereby to facilitate separation of the mold elements from each other and from the casting, one of said elements having a pressure chamber detachably secured thereto and means to introduce material to the cavity comprising a passage formed in said element between the chamber and the cavity.

14. An anatomical mold structure comprising a composite body portion formed of a plurality of mold elements having recesses combining to form a casting cavity, said elements having complementary contacting faces surrounding and adjoining the cavity, a portion of said faces being formed with undulations corresponding to the predominant marginal contour of the cavity and extending to the undulating predominant marginal contour of said cavity whereby to facilitate separation of the mold elements from each other and from the casting.

15. An anatomical mold structure comprising a composite body portion formed of three mold elements having recesses combining to form a casting cavity, said elements having complementary contacting faces surrounding and adjoining the cavity, said faces being formed with undulations throughout their entire area and extending to the undulating predominant marginal contour of the cavity whereby to facilitate separation of the mold elements from each other and from the casting.

16. A mold having a casting cavity with intricate surface and marginal contours, comprising a plurality of mold elements having complementary recesses combining to form said cavity, each of said elements having their surfaces of separation formed with undulations corresponding to the undulating predominant marginal contour of the cavity, said undulations extending to the undulating marginal contours of the cavity whereby to facilitate separation of the mold elements from each other and from the casting, one of said elements having a pressure chamber formed therewith, means to introduce material to the cavity comprising a passage formed in said element between the chamber and the cavity, means associated with said surfaces for cooperating in the proper assembly and register of the elements and to secure preliminary movement of separation along definite lines of travel and means to control the temperature of the mold comprising a plurality of channels formed in one of the mold elements adapted to receive a temperature controlling medium.

FRANK A. BRIDGETT.